United States Patent [19]

Drake

[11] 3,896,173

[45] July 22, 1975

[54] TWO STAGE CATALYTIC HYDROGENATION OF UNSATURATED DINITRILES EMPLOYING RUTHENIUM, NICKEL OR MIXTURE THEREOF AS CATALYTIC AGENT

[75] Inventor: Charles A. Drake, Bartlesville, Okla.

[73] Assignee: Phillips Petroleum Company, Bartlesville, Okla.

[22] Filed: Nov. 19, 1973

[21] Appl. No.: 416,784

[52] U.S. Cl............................ 260/583 P; 260/583 K
[51] Int. Cl.............................................. C07c 87/14
[58] Field of Search..................... 260/583 K, 583 P

[56] References Cited
UNITED STATES PATENTS
2,781,399  2/1957  Shapiro................................ 260/583
3,408,397  10/1968  Feldman et al. ................ 260/583 K Primary Examiner—Joseph P. Brust

[57] ABSTRACT

The catalytic hydrogenation of an unsaturated dinitrile reactant of the formula

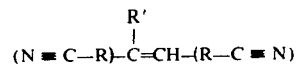

wherein each R is an alkylene or an alkylidene radical, and each R' is an alkyl radical, is carried out in two stages in the presence of hydrogen, a suitable diluent, and a catalyst selected from elemental ruthenium, elemental nickel, a ruthenium compound which is reducible by hydrogen to elemental ruthenium, elemental nickel compound which is reducible by hydrogen to elemental nickel, and mixtures thereof. Ammonia is present in the first stage reaction, but is absent from the second stage reaction.

18 Claims, No Drawings

TWO STAGE CATALYTIC HYDROGENATION OF UNSATURATED DINITRILES EMPLOYING RUTHENIUM, NICKEL OR MIXTURE THEREOF AS CATALYTIC AGENT

This invention relates to a process for the preparation of saturated aliphatic diamines by the catalytic hydrogenation of unsaturated aliphatic dinitriles.

In general, various processes for the catalytic hydrogenation of unsaturated aliphatic dinitriles to saturated aliphatic diamines are known to the art. Group VIII metal catalysts such as cobalt, nickel, ruthenium, rhodium, or palladium have been employed as effective catalysts for the hydrogenation of various feedstocks in these processes. However, it has been discovered that many of these hydrogenation catalyst materials are not always efficient or effective for the hydrogenation of unsaturated aliphatic dinitriles having the formula

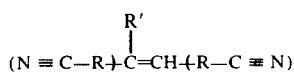

wherein each R is an alkylene or an alkylidene radical, and each R' is an alkyl radical. It has also been proposed to effect the hydrogenation of alkylene-substituted aliphatic dinitriles with a Group VIII metal catalyst in two stages with ammonia being present only in the second stage. However, this proposal results in low yields of the desired product and high production of undesired heavy byproduct material.

In accordance with this invention, it has been found that these branched-chain unsaturated aliphatic dinitriles are efficiently reduced to branched-chain saturated aliphatic diamines by the use of two reaction stages, with each stage employing hydrogen, a suitable diluent, and a catalyst selected from the group consisting of ruthenium, nickel, ruthenium or nickel compounds which are reducible by hydrogen to the elemental form, and mixtures thereof, with ammonia being present in the first stage reaction and being absent from the second stage reaction.

It is an object of this invention to provide a process for the catalytic hydrogenation of branched-chain unsaturated aliphatic dinitriles to branched-chain saturated aliphatic diamines. Another object is to provide an efficient two-stage process for the catalytic hydrogenation of an unsaturated dinitrile having the formula

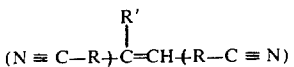

wherein each R is an alkylene or an alkylidene radical, and each R' is an alkyl radical. Still another object is to provide an efficient process for the catalytic hydrogenation of a mixture of branched-chain unsaturated aliphatic dinitriles to produce saturated aliphatic diamines. Still another object is to provide an efficient process for the catalytic hydrogenation of branched-chain unsaturated aliphatic diamines under reaction conditions which limit the occurrence of byproduct reactions. Other objects, aspects and advantages of the invention will be apparent from a study of the specification and the appended claims.

The branched-chain unsaturated aliphatic dinitriles which are advantageously and efficiently hydrogenated in accordance with the process of this invention are the unsaturated dinitriles of the formula:

(I) 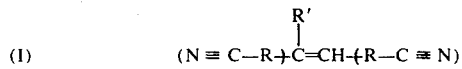

wherein each R is independently selected from the group consisting of an alkylene radical and an alkylidene radical, and R' is an alkyl radical. Each R will generally have from 1 to 15 carbon atoms, preferably from 1 to 6, and more preferably from 1 to 3 carbon atoms. R' will generally have from 1 to 15 carbon atoms, preferably from 1 to 6 carbon atoms, and more preferably from 1 to 3 carbon atoms. In general, the unsaturated dinitrile reactant of formula (I) will contain from 7 to 30 carbon atoms, preferably from 8 to 16 carbon atoms, and more preferably from 9 to 12 carbon atoms.

Representative of unsaturated reactant species of formual (I) include such compounds as 4-methyl-3-hexenedinitrile, 4-ethyl-3-hexenedinitrile, 5-methyl-4-nonenedinitrile, 5-ethyl-4-decenedinitrile, 7-methyl-6-tridecenedinitrile, 7-methyl-6-pentadecenedinitrile, 1-2-methyl-12-tetracosenedinitrile, 10-hexyl-9-tetracosenedinitrile, 2,3-dimethyl-3-hexanedinitrile, 2,4,6-trimethyl-3-heptenedinitrile, 4-ethyl-6,7-dimethyl-3-octenedinitrile, 2,4,6-triethyl-3-octenedinitrile, 2-ethyl-4,6-dipropyl-3-octenedinitrile, 2-methyl-4,6,8,10-tetrapropyl-3-dodecenedinitrile, 2,4,7,9,11,1-3,15-heptaethyl-6-hexadecenedinitrile, and mixtures thereof.

If desired, other unsaturated dinitrile reactants can be present and effectively hydrogenated during the hydrogenation of the unsaturated dinitriles of formula (I). Thus, in addition to the unsaturated dinitrile reactants of formula (I), the dinitrile feedstock can contain one or more unsaturated dinitrile reactants of the formula:

(II) 

wherein each R'' is independently selected from the group consisting of an alkylene radical and an alkylidene radical. In general, each R'' will have from 1 to 15 carbon atoms, preferably from 1 to 7 carbon atoms, and more preferably from 1 to 4 carbon atoms. The dinitriles of formula (II) will generally contain from 6 to 30 carbon atoms, preferably from 8 to 16 carbon atoms, and more preferably from 9 to 12 carbon atoms.

Representative unsaturated dinitrile reactants of formula (II) include such compounds as 3-methylenehexanedinitrile, 4-methyleneheptanedinitrile, 5-methylenenonanedinitrile, 6-methyleneundecanedinitrile, 7-methylenetridecanedinitrile, 8-methylenepentadecanedinitrile, 12-methylenetetracosanedinitrile, 15-methylenenonacosanedinitrile, 2-methyl-3-methylenepentanedinitrile, 2,4-dimethyl-3-methylenepentanedinitrile, 2-methyl-4-methyleneoctanedinitrile, 2-methyl-7-ethyl-4-methyleneoctanedinitrile, 2,4,8-trimethyl-6-methylenedodecanedinitrile, 2,4,8,10-tetrapropyl-6- methylenedodecanedinitrile, 2,26-dimethyl-14-methyleneheptacosanedinitrile, and mixtures thereof.

Unsaturated dinitriles having a structure other than that of formulas (I) and (II) can be present during the hydrogenation reaction, if desired. Similarly, other compounds which may be found in the feed source of the dinitriles of formulas (I) and (II) can be present so long as such additional compounds do not significantly adversely affect the hydrogenation of the dinitriles of formulas (I) and (II). Where other dinitriles are present in the feedstock, the dinitriles of formula (I) will generally constitute at least 0.1 weight percent of the total dinitriles. The significant advantages of the invention increase with increasing concentrations of the dinitriles of formula (I) in the feedstock. Thus, the process of the invention is even more advantageous for concentrations of the dinitriles of formula (I) in the feedstock of at least 5 weight percent. The invention is considered to be particularly desirable for dinitrile feedstocks having a concentration of the dinitriles of formula (I) of at least 10 weight percent.

A presently preferred branched-chain unsaturated aliphatic dinitrile feedstock for employment in the practice of this invention is the dinitrile reaction product mixture obtained by the reaction of isobutylene and acrylonitrile. This dinitrile reaction product mixture generally comprises 5-methyl-4-nonenedinitrile, 2,4-dimethyl-4-octenedinitrile, 2,4-dimethyl-3-octenedinitrile, 2,4,6-trimethyl-3-heptenedinitrile, 5-methylenenonanedinitrile, 2-methyl-4-methyleneoctanedinitrile, and 2,6-dimethyl-4-methyleneheptanedinitrile. The first four named compounds in this mixture are of the type of formula (I), while the last three named compounds in this mixture are of the type of formula (II). The weight ratio of the dinitriles of formula (I) to the dinitriles of formula (II) in this mixture is generally in the range of about 10:1 to about 1:10.

In the practice of this invention, the catalytic hydrogenation of the unsaturated dinitrile reactant of formula (I) results primarily in the formation of saturated diamine reaction products having the formula:

(III)  $(H_2N-CH_2-R)-\overset{R'}{\underset{|}{CH}}-CH_2-(R-CH_2-NH_2)$ wherein R and R' are as defined hereinbefore. The catalytic hydrogenation of an unsaturated dinitrile reactant of formula (II) results primarily in the formulation of saturated diamine reaction products having the formula:

(IV)  $(H_2N-CH_2-R'')-\overset{CH_3}{\underset{\underset{H}{|}}{C}}-(R''-CH_2-NH_2)$ wherein R'' is as defined hereinbefore.

The practice of this invention is particularly suited to the catalytic hydrogenation of this mixture of species of formula (I) and formula (II) for the purpose of achieving saturated diamine reaction products which are substantially free of any olefinic unsaturation and preferably essentially free of any olefinic unsaturation. The phrase "substantially free of olefinic unsaturation" signifies that the diamine reaction products contain less than about 1 weight percent unsaturated diamine reaction product based on the total weight of unsaturated and saturated diamine reaction products wherein the weight percents are determined by conventional gas-liquid chromatographic analysis (GLC). The phrase "essentially free of olefinic unsaturation" signifies that the diamine reaction products contain less than about 0.1 weight percent unsaturated diamine reaction product based on the total weight of unsaturated and saturated diamine reaction products wherein the weight percents are determined by conventional GLC analysis techniques. These diamine reaction products which are at least substantially free, and preferably essentially free, of olefinic unsaturation are advantageously employed in the preparation of linear terephthalamide polymers.

One of the most important advantages of the catalytic hydrogenation process of this invention is directly related to the production of a mixture of diamines which are essentially free of olefinic unsaturation from the unsaturated dinitrile product mixture produced by the reaction of acrylonitrile and isobutylene. This advantage is significant since prior art catalytic hydrogenation of the acrylonitrile and isobutylene reaction product mixture failed to substantially or completely reduce the olefinic unsaturation of the unsaturated dinitrile feedstock, thereby producing a reaction product mixture containing branched-chain aliphatic diamines having substantial olefinic unsaturation in the carbon skeleton. The separation of the branched-chain olefinically unsaturated diamines from the saturated diamines is inconvenient, and polyamides prepared from the mixtures containing a significant amount of unsaturated diamines have been found to be unsuited or undesirable in the preparation of polyamide fibers, particularly the terephthalamide polymers. Thus, the catalytic hydrogenation of this invention is a significant advance in the preparation of such polyamides.

The catalysts that are considered to be suitable for employment in either or both stages in the catalytic hydrogenation process of this invention include finely divided elemental ruthenium, elemental nickel, compounds of ruthenium or nickel which are reducible by hydrogen to finely divided elemental ruthenium or nickel, and mixtures thereof. Suitable reducible compounds include the oxides, halides, nitrates, sulfates, oxalates, acetates, carbamates, propionates, tartrates, hydroxides, and the like, and mixtures thereof. Specific examples include ruthenium oxide, ruthenium chloride, ruthenium nitrate, ruthenium acetate, ruthenium carbonate, ruthenium hydroxide, Raney nickel, nickel oxide, nickel chloride, nickel nitrate, nickel oxalate, nickel acetate, and nickel hydroxide, and the like. Catalyst mixtures comprising ruthenium and nickel can be employed in any weight ratio of ruthenium to nickel without deleteriously affecting the catalytic hydrogenation benefits associated with the practice of this invention. The weight ratio of catalyst to unsaturated dinitrile reactant, based on the weight of the total of ruthenium and nickel contained therein, can be varied as desired. For the purpose of maintaining reasonable reaction rates under economically attractive catalyst reaction kinetics, it is generally preferred that the weight ratio of the total of nickel and ruthenium to the unsaturated dinitrile reactants be maintained within a range of about 0.01:100 to about 30:100, and preferably in the range of about 0.1:100 to about 20:100, and more preferably in the range of about 5:100 to about 15:100.

In the practice of this invention, it is often desirable to employ catalytic amounts of elemental ruthenium, elemental nickel, reducible compounds of ruthenium or nickel, or mixtures thereof supported by a solid catalyst carrier which does not deleteriously affect the catalytic hydrogenation process of this invention. Such supports include, for example, carbon, kieselguhr, silica, alumina, silica-alumina, calcium carbonate, barium carbonate, asbestos, pumice, clays, and the like, and mixtures thereof. The nickel and/or ruthenium catalyst can be added to the catalyst support by any of the methods well known in the art. For example, the supported catalysts can be prepared by dry mixing the components or by impregnating the support with a solution or dispersion of nickel and/or ruthenium in elemental form or in the form of reducible compounds thereof. The supported catalyst can be pretreated with hydrogen to reduce the compounds, or such reduction can be achieved in the hydrogenation reactor. When a support is employed, the elemental ruthenium and/or elemental nickel content will generally be in the range of about 0.5 to about 50 weight percent, preferably in the range of about 1 to about 10 weight percent, based on the weight of the total catalyst components. Presently preferred catalysts include ruthenium on alumina having a ruthenium metal content of about 5 percent by weight, based on the total weight of the catalyst and the support material, and Raney nickel. These presently preferred catalytic forms, as well as other suitable catalysts such as 5 weight percent ruthenium on charcoal, are commercially available.

Any catalytic hydrogenation temperature can be employed which provides the desired degree of catalytic efficiency in the hydrogenation of the branched-chain unsaturated aliphatic dinitrile containing feedstock. The hydrogenation temperatures in the first stage will generally be within the range of about 30° C. to about 200° C., and preferably will be within the range of about 70° C. to about 150° C. The hydrogenation temperature in the second stage will generally be within the range of about 100° C. to about 250° C. and preferably will be within the range of about 125° C. to about 200° C.

The catalytic hydrogenation of branched-chain unsaturated aliphatic dinitriles can be carried out in the first stage at any hydrogen pressure wherein the nitrile groups are reduced in the presence of ammonia, hydrogen and a suitable diluent. The catalytic hydrogenation of the difficultly reducible carbon to carbon double bond illustrated in formula (I) can be carried out in the second stage at any suitable hydrogenation pressure. Generally, suitable hydrogen pressures for both stages are within the range of from about 500 to about 5000 psig, but lower or even higher hydrogen pressures can be employed. Preferably, due to economic considerations, hydrogen pressures within the range of about 1000 to about 3000 psig are employed. It may be desirable to employ higher hydrogen pressures at lower reaction temperatures to achieve the desired degree of hydrogenation within a reasonable amount of time.

Any time interval suited for the desired catalytic hydrogenation in each stage can be employed in the practice of this invention. However, time intervals economically attractive to the process are generally within the range of about 15 minutes to about 5 hours for the first stage of a batch hydrogenation process, and generally within the range of about 15 minutes to about 5 hours for the second stage of the batch process. A total reaction time in the range of about 1 to about 6 hours is presently preferred in order to insure substantially complete hydrogenation of any unsaturated olefinic bonds in the feedstock as well as complete hydrogenation of the nitrile groups to primary amino groups. The catalytic hydrogenation of unsaturated dinitriles in accordance with the process of this invention can be carried out as a continuous process at any suitable liquid hourly space velocity (LHSV). However, the liquid hourly space velocity rates will generally be within the range of about 0.1 to about 10, more preferably from about 0.5 to about 2, volumes of unsaturated dinitrile reactant plus diluent per volume of catalyst (including the volume of any catalyst support if any is present).

The diluent is selected from the class consisting of saturated aliphatic alcohols containing from 1 to 12 carbon atoms per molecule, unsubstituted acyclic and unsubstituted cyclic ethers having 4 to 12 carbon atoms per molecule, and saturated hydrocarbons having 4 to 12 carbon atoms per molecule. The term "unsubstituted" indicates that there are no substituents other than hydrocarbyl radicals. Examples of alcohol diluents include methanol, ethanol, 2-propanol, 2-methyl-2-propanol, 2-methyl-2-butanol, 2-ethyl-2-hexanol, 2-butanol, 1-hexanol, 1-octanol, 2-decanol, 1-dodecanol, and the like, and mixtures thereof. The foregoing examples of saturated aliphatic alcohols are unsubstituted alkanols containing from 1 to 12 carbon atoms per molecule. Examples of alkanes and cycloalkanes include butane, pentane, hexane, decane, dodecane, cyclobutane, cyclopentane, cyclohexane, cyclodecane, cyclododecane, 2-methylbutane, methylcyclopentane, 2,2,4-trimethylpentane, and mixtures thereof. Examples of ethers include 1,3-dioxane, 1,4-dioxane, tetrahydrofuran, 4,4-dimethyl-1, 3-dioxane, and mixtures thereof. To facilitate handling of the reaction mixtures, the weight ratio of unsaturated dinitrile reactants to diluent charged to the reaction zone is generally within the weight ratio range of about 0.001:100 to about 15:100, and is preferably in the range of about 0.1:100 to about 12:100.

Ammonia is employed in the first stage of the process of this invention as a means of suppressing undesirable side reactions such as the formation of secondary and tertiary amines. Any amount of ammonia can be employed which is effective in deterring or reducing undesirable side reactions. In general, the mol ratio of ammonia to cyano group (there being two cyano groups in each unsaturated dinitrile) will be in the range of about 1:1 to about 25:1, and preferably will be in the range of about 7:1 to about 15:1.

At the conclusion of the first stage reaction, the reactor is generally cooled to room temperature and then vented to allow essentially all of the ammonia to escape from the reactor. Although it will generally not be necessary, techniques other than venting can be employed in addition to or in lieu of venting to accomplish the removal of the ammonia. It is generally desirable that the level of ammonia be reduced to less than 5, and preferably less than 2, weight percent based on the unsaturated dinitrile in the charge to the first reaction stage, in order to minimize the effect of the ammonia on the catalyst activity. After the ammonia is vented, additional catalyst can be charged to the reactor, if desired. Such additional catalyst can be the same as the catalyst employed in the first stage reaction or it can be another suitable catalyst. Additional diluent is generally not required for the second stage reaction unless excessive diluent loss occurred during the removal of the ammonia. It is also within the scope of this invention to recover the product from the first reaction stage by separation of the same from the catalyst, diluent, and ammonia, and to utilize this product along with fresh catalyst and diluent as the charge to the second stage reaction.

Processing of the effluent from the second stage reaction for the recovery of the desired end product, the branched-chain saturated aliphatic diamines, including preferred branched-chain saturated aliphatic diamine reaction products which contain less than about 0.1 percent unsaturated diamine by weight of the total reaction product as determined by GLC, as well as any resulting reaction byproducts, any unconsumed reactants, hydrogen, and/or diluents can be carried out by any conventional separation means. In general, at the conclusion of the second stage of the catalytic hydrogenation process, the reaction effluent is cooled and depressurized with the recovery, if desired, of any diluent which is vented from the reaction effluent during the depressurization operation. The diluent can be returned or recycled to either reaction stage if desired. The reaction products can be separated from the catalyst by conventional filtration means. The filtrate containing the at least substantially completely saturated diamines can be conveniently separated from any reaction byproducts or any diluent remaining in the filtrate by any conventional fractional distillation.

The following examples are presented in further illustration of the invention.

EXAMPLE I

First Stage Reaction

A one liter autoclave was charged with 80 g (0.494mol) of the purified reaction product of two mols of acrylonitrile with one mol of isobutylene. This reaction product consisted essentially of a mixture of isomeric unsaturated dinitriles having one carbon-carbon double bond and 10 carbon atoms per molecule. The principal isomers were 5-methylenenonanedinitrile and 5-methyl-4-nonenedinitrile with very small amounts of more highly branched isomers such as 2-methyl-4-methyleneoctanedinitrile, among others. For simplicity, the above-described reaction product will hereafter be called diadduct. Also charged to the one liter autoclave was 300 ml (237 g) of methanol and 10 g of Raney nickel. The system was flushed with nitrogen and then charged with 190 g (11.18 mol) of ammonia. The reactor was then pressured with hydrogen to 1200 psig and heated at 130° C. for 1.75 hours. The mixture was stirred throughout the reaction period. At the end of this first reaction stage, the reactor was cooled, vented and the contents filtered to remove the catalyst. The filtrate was distilled under vacuum to provide an intermediate product comprising unsaturated diamines.

The above procedure was repeated seven times employing essentially the same conditions in the preparation of a large sample of the intermediate product (unsaturated diamines).

Second Stage Reaction

A 1 liter autoclave was charged with 350 ml (277 g) methanol, 2.0 g ruthenium dioxide, and 150 ml (about 120 g) of the unsaturated diamine intermediate product produced in the first stage reaction above. The system was flushed with nitrogen, pressured to 1200 psig with hydrogen and heated at 145° C. for 2 hours. At the end of the reaction period for the second stage reaction, the reactor was cooled, vented and the contents filtered. The filtrate was concentrated by evaporation of essentially all of the diluent under vacuum. GLC analysis of the product indicated that essentially complete reduction to the saturated diamine had been accomplished.

The above procedure for the second stage reaction was repeated five times under essentially the same conditions. The products from each of the six runs were combined and fractionally distilled to provide 428 g (74% yield) of saturated diamines and 120 g of distillation residue (heavies). The weight ratio of saturated diamines to heavies was 3.57.

COMPARATIVE EXAMPLE A

A control run, which represented a method of the prior art wherein ammonia was present in the second step but not the first step, was also carried out. A one liter autoclave was charged with 350 ml (277 g) methanol, 20 g (0.123 mol) of the diadduct described in Example I and 10 g of Raney nickel. The system was flushed with nitrogen, pressured to 1400 psig with hydrogen and heated at 150° C. for 2 hours. At the end of this first reaction period the reactor was cooled and vented, and then 2.0 g ruthenium dioxide ($RuO_2$) was added. The system was flushed with nitrogen, charged with 40 g (2.35 mol) of ammonia, pressured to 1400 psig with hydrogen, and heated at 150° C. for 2 hours. At the end of this second reaction period the reactor was cooled, vented and the contents filtered. The filtrate was concentrated by evaporation of the diluent under vacuum. The product was analyzed by GLC which indicated complete reduction to the saturated diamine had occurred. However, fractional distillation of the product provided only 6.0 g (28% yield) of the saturated diamines and 15.5 g of heavies. The weight ratio of saturated diamines to heavies was 0.39. A comparison of the results of Example I and Comparative Example A demonstrates that the presence of ammonia in the first step is much preferred to the prior art teaching that ammonia should be present only in the second step of the unsaturated dinitrile hydrogenation.

EXAMPLE II

A one liter autoclave was charged with 350 ml (277 g) methanol, 2.0 g ruthenium dioxide ($RuO_2$), and 30 g (0.185 mol) of the diadduct described in Example I. The system was flushed with nitrogen, charged with 60 g (3.53 mol) ammonia, pressure to 1400 psig with hydrogen and heated at 130° C. for about 0.5 hour. The reactor was cooled, vented to remove ammonia then repressured to 1400 psig with hydrogen and heated at 130° C. for about 0.5 hour. The reactor was again cooled, vented and the contents filtered. The filtrate was concentrated by evaporation of the diluent under vacuum. The product was analyzed by GLC which indicated that complete reduction to the saturated diamine had occurred. The product was fractionally distilled to provide 26.0 g (82% yield) of saturated diamines and only 3.5 g heavies. The weight ratio of saturated diamines to heavies was 7.43.

COMPARATIVE EXAMPLE B

Another control run was carried out in the following manner. A one liter autoclave was charged with 350 ml (277 g) methanol, 2.0 g ruthenium dioxide and 30 g (0.185 mol) of the diadduct described in Example I. The system was flushed with nitrogen, pressured to 1500 psig with hydrogen and heated at 130° C. for 2 hours. The reactor was cooled, vented, charged with 60 g (3.53 mol) ammonia, pressured to 1500 psig with hydrogen and heated at 170° C. for 2 hours. At the end of this second reaction step the reactor was cooled, vented and the contents filtered. The filtrate was concentrated by evaporation of the diluent under vacuum. The product was fractionally distilled to provide only 8.0 g (25% yield) of saturated diamines and 23.0 g of heavies. The weight ratio of saturated diamines to heavies was 0.35. Again it is seen from a comparison of the results of Example II and Comparative Example B that it is much preferred to have ammonia present in the first step as in the instant invention rather than only in the second step as taught in the prior art.

EXAMPLE III

A one liter autoclave was charged with 350 ml (275 g) of tert-butyl alcohol, 10 g Raney nickel, and 30 g (0.185 mol) of the diadduct described in Example I. The system was flushed with nitrogen, charged with 60 g (3.53 mol) of ammonia, pressured to 1500 psig with hydrogen and heated at 130° C. for 2 hours. At the end of this reaction period the reactor was cooled, vented to remove the ammonia, and the contents filtered. The filtrate was concentrated by evaporation of essentially all of the diluent. The product was analyzed by GLC and was found to contain considerable unsaturated diamine component.

The above product was then charged to a one liter autoclave with 350 ml (275 g) of tert-butyl alcohol and 10 g of Raney nickel. The system was flushed with nitrogen, pressured to 1400 psig with hydrogen, and heated at 130° C. for 2 hours. At the end of this reaction period the reaction mixture was treated in the manner described above for the first step. GLC analysis of the product showed that hydrogenation was complete to the saturated diamine. The product was fractionally distilled and there was obtained 19.7 g. (62% yield) of saturated diamines and 9.0 g of distillation residue (heavies). The weight ratio of saturated diamines to heavies was 2.19.

What is claimed is:

1. A process for the catalytic hydrogenation of an unsaturated dinitrile feedstock comprising at least one unsaturated dinitrile compound of the formula:

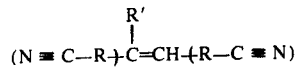

wherein each R is independently selected from the group consisting of an alkylene radical and an alkylidene radical, R' is an alkyl radical, and the number of carbon atoms in said compound is in the range of 7 to 30; which comprises contacting said feedstock under suitable hydrogenation conditions in a first stage reaction zone with ammonia; hydrogen; at least one diluent selected from the group consisting of unsubstituted alkanols having from 1 to 12 carbon atoms per molecule, saturated hydrocarbons having from 4 to 12 carbon atoms per molecule, and unsubstituted acyclic and unsubstituted cyclic ethers having from 4 to 12 carbon atoms per molecule; and a catalyst consisting essentially of a catalytic component selected from the group consisting of elemental ruthenium, elemental nickel, ruthenium compounds which are reducible by hydrogen to elemental ruthenium at said hydrogenation conditions, nickel compounds which are reducible by hydrogen to elemental nickel at said hydrogenation conditions, and mixtures thereof; removing ammonia from the first stage reaction zone effluent to provide an intermediate unsaturated diamine product at least substantially free of ammonia; and contacting said intermediate unsaturated diamine product under suitable hydrogenation conditions in a second stage reaction zone with hydrogen, at least one of said diluents, and at least one of said catalysts to thereby effect the at least substantially complete hydrogenation of said at least one unsaturated dinitrile compound to the corresponding branched-chain saturated diamine product.

2. A process in accordance with claim 1, wherein said feedstock further comprises at least one unsaturated dinitrile reactant of the formula:

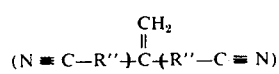

wherein each R'' is independently selected from the group consisting of an alkylene radical and an alkylidene radical, and the number of carbon atoms in said reactant is in the range of 7 to 30.

3. A process in accordance with claim 1 wherein the catalyst in each reaction zone together with a solid catalyst support forms a catalyst composition, the content of the elemental ruthenium and/or elemental nickel being in the range of about 0.5 to about 50 weight percent of said catalyst composition.

4. A process in accordance with claim 1 wherein each of said alkylene radical, said alkylidene radical and said alkyl radical has from 1 to 15 carbon atoms.

5. A process in accordance with claim 1 wherein said at least one unsaturated dinitrile compound comprises a mixture of 5-methyl-4-nonenedinitrile, 2,4-dimethyl-4-octenedinitrile, 2,4-dimethyl-3-octenedinitrile, and 2,4,6-trimethyl-3-heptenedinitrile.

6. A process in accordance with claim 1 wherein the weight ratios of the total of nickel and ruthenium present in each of said first and second stage reaction zones to the unsaturated dinitriles in the feedstock charged to said first stage reaction zone are in the range of about 0.01:100 to about 30:100, the mol ratio of ammonia to cyano groups in the first stage reaction zone is in the range of about 1:1 to about 25:1, the amount of ammonia in the second stage reaction zone is less than 5 weight percent of the unsaturated dinitriles in the feedstock charged to the first reaction zone, the hydrogen pressure in each of said first and second stage reaction zones is in the range of about 500 to about 5000 psig, the weight ratios of the unsaturated dinitriles in the feedstock charged to said first stage reaction zone to the diluent in each reaction zone are in the range of about 0.001:100 to about 15:100, wherein the temperature in said first stage reaction zone is in the range of about 30°C to about 200°C, wherein the temperature in said second stage reaction zone is in the range of about 100°C to about 250°C, and wherein the reaction time for each of said first and second stage reaction zones in a batch process is in the range of about 15 minutes to about 5 hours and the liquid hourly space velocity rate in said first stage reaction zone in a continuous process is in the range of about 0.1 to about 10 volumes of unsaturated dinitrile plus diluent per volume of catalyst.

7. A process in accordance with claim 1 wherein the weight ratio of the total of nickel and ruthenium present in each of said first and second stage reaction zones to the unsaturated dinitriles in the feedstock charged to said first stage reaction zone are in the range of about 0.1:100 to about 20:100, the mol ratio of ammonia to cyano groups in the first stage reaction zone is in the range of 7:1 to about 15:1, the amount of ammonia in the second stage reaction zone is less than 1 weight percent of the unsaturated dinitriles in the feedstock charged to the first reaction zone, the hydrogen pressure in each of said first and second stage reaction zones is in the range of about 1000 to about 3000 psig, the weight ratios of the unsaturated dinitriles in the feedstock charged to said first stage reaction zone to the diluent in each reaction zone are in the range of about 0.1:100 to about 12:100, wherein the temperature in said first stage reaction zone is in the range of about 70°C to about 150°C, and wherein the temperature in said second stage reaction zone is in the range of about 125°C to about 200°C.

8. A process in accordance with claim 7 wherein the catalyst employed in said first stage reaction zone and said second stage reaction zone is selected from the group consisting of elemental ruthenium, ruthenium compounds which are reducible by hydrogen to elemental ruthenium under the hydrogenation conditions employed in said first stage reaction zone, and mixtures thereof.

9. A process in accordance with claim 8 wherein each of said alkylene radical, said alkylidene radical and said alkyl radical has from 1 to 6 carbon atoms.

10. A process in accordance with claim 9 wherein said catalyst is ruthenium dioxide and said diluent is methanol.

11. A process in accordance with claim 7 wherein the catalyst employed in said first stage reaction zone and said second stage reaction zone is selected from the group consisting of elemental nickel, nickel compounds which are reducible by hydrogen to elemental nickel under the hydrogenation conditions employed in said first stage reaction zone, and mixtures thereof.

12. A process in accordance with claim 11 wherein each of said alkylene radical, said alkylidene radical and said alkyl radical has from 1 to 6 carbon atoms.

13. A process in accordance with claim 12 wherein said catalyst is Raney nickel and said diluent is t-butyl alcohol.

14. A process in accordance with claim 7 wherein the catalyst employed in said first stage reaction zone is selected from the group consisting of elemental nickel, nickel compounds which are reducible by hydrogen to elemental nickel under the hydrogenation conditions employed in said first stage reaction zone, and mixtures thereof; and wherein the catalyst employed in said second stage reaction zone is selected from the group consisting of elemental ruthenium, ruthenium compounds which are reducible by hydrogen to elemental ruthenium under the hydrogenation conditions employed in said second stage reaction zone, and mixtures thereof.

15. A process in accordance with claim 14 wherein the catalyst employed in said first stage reaction zone comprises Raney nickel and the catalyst employed in said second stage reaction zone comprises ruthenium dioxide.

16. A process in accordance with claim 2 wherein said feedstock comprises 5-methylene-nonanedinitrile and 5-methyl-4-nonenedinitrile.

17. A process in accordance with claim 1 further comprising recovering a diamine product containing less than about 1 weight percent unsaturated diamines.

18. A process in accordance with claim 1 further comprising recovering a diamine product essentially free of unsaturation.

* * * * *